United States Patent
Merchant (10) Patent No.: US 6,419,156 B1
(45) Date of Patent: Jul. 16, 2002

(54) PIEZOELECTRIC SCAN ENGINE IN PC CARD FORMAT

(75) Inventor: Peter Merchant, Dorset (GB)

(73) Assignee: Telxon Corporation, Holtsville, NY (US)

( * ) Notice: Subject to any disclaimer, the term of this patent is extended or adjusted under 35 U.S.C. 154(b) by 0 days.

(21) Appl. No.: 09/447,847

(22) Filed: Nov. 23, 1999

(51) Int. Cl.[7] .................................................. G06K 7/10
(52) U.S. Cl. .............................. 235/462.45; 235/462.25
(58) Field of Search ....................... 235/462.01, 462.02, 235/462.03, 462.25, 465.26, 462.49, 472.01, 472.02, 472.03, 454, 484, 470

(56) References Cited

U.S. PATENT DOCUMENTS

| 3,840,293 | A | * | 10/1974 | Fine et al. ................ 350/285 |
| 4,484,569 | A | * | 11/1984 | Driller et al. ............. 128/660 |
| 5,280,164 | A | | 1/1994 | Barkan ..................... 235/467 |
| 5,373,360 | A | * | 12/1994 | Martin et al. ............. 356/350 |
| 5,422,469 | A | * | 6/1995 | Bard et al. ................ 235/462 |
| 5,479,825 | A | * | 1/1996 | Williams et al. .......... 73/644 |
| 5,521,367 | A | * | 5/1996 | Bard et al. ................ 235/462 |
| 5,625,483 | A | | 4/1997 | Swartz ..................... 359/224 |
| 5,627,670 | A | * | 5/1997 | Minoura et al. .......... 359/212 |
| 5,794,023 | A | | 8/1998 | Hobbs et al. ............. 359/565 |
| 5,864,128 | A | | 1/1999 | Plesko ..................... 235/462 |
| 5,932,860 | A | | 8/1999 | Plesko ..................... 235/454 |
| 5,955,721 | A | | 9/1999 | Dickson et al. .......... 235/462 |
| 6,127,681 | A | * | 10/2000 | Sato et al. ............... 250/306 |
| 6,198,565 | B1 | * | 3/2001 | Iseki et al. ............... 359/224 |
| 6,321,988 | B1 | * | 11/2001 | Merchant et al. ....... 235/462.12 |

* cited by examiner

Primary Examiner—Thien M. Le
(74) Attorney, Agent, or Firm—Amin & Turocy, LLP (57) ABSTRACT

A system for scanning a target is provided. A light source directs a beam of light toward a radially-arced piezoelectric material having a reflective surface. The reflective surface directs at least a portion of the beam of light to the target. A power source provides movement in the radially-arced piezoelectric material to scan at least a portion of the beam of light across at least a portion of the target. The at least a portion of the beam of light is reflected onto a photosensor to provide an electrical signal representing the reflected light.

28 Claims, 6 Drawing Sheets

PIEZOELECTRIC SCAN ENGINE IN PC CARD FORMAT

FIELD OF THE INVENTION

The present invention generally relates to a system and method for scanning and reading bar codes. In particular the present invention relates to a low-cost, one-dimensional scanner and reader which may be economically implemented on a PC card or hand-held scanner.

BACKGROUND OF THE INVENTION

Bar code scanning and reading devices provide one of the great technological innovations of modern times. From quick check-outs in the grocery store to accurate inventory control for businesses, scanners/readers provide almost instantaneous computer recognition and documentation of various items while greatly relieving humans of mundane tasks thereby saving time and effort. Bar codes are typically vertical black and white bars that are scanned in a sequential fashion. In order for a computer to interpret a bar code, a scanner generally illuminates the bar code with a beam of light in a sequential, straitline fashion, while at the same time, a reader detects whether or not a region of a bar code is black or white. Depending on the order and spacing of the vertical black and white bars, a unique number pattern may be determined for a particular item. In most cases, the bar code scanners and readers have been combined to form one integral device to perform bar code scanning and reading simultaneously. Many styles for these devices include: handheld gun style devices; wand-like devices; pen-like devices; and stationarily mounted devices in factories for example. In fact, a vast array of styles, shapes, and sizes of devices exist to provide for many diverse bar code applications.

Over the years, fairly complicated and elaborate mechanisms have evolved to scan bar codes. In order to produce a straitline, sequential scan pattern across the face of a bar code, many scanners employ rotating components to deflect a beam of light from one end of the bar code to another. In many conventional systems, the rotating components may be rotating mirrors that deflect a continuous light beam across the bar code as the mirror is rotated in front of the light beam. In other systems, the beam of light itself may be rotated while focusing the light directly on the bar code. Many times, motors and other electro-mechanical devices are employed to provide rotate the mirrors and/or lights. Unfortunately, mechanical components such as motors and rotating mirrors tend to wear over time which may ultimately produce mechanical failures in the scanners.

Other techniques have evolved which employ electronic systems to cause a light beam to move across a bar code. While solving some of the aforementioned problems with moving mechanical components, many of these electronic systems are fabricated by employing elaborate processes and materials. Also, many conventional electronic systems employ complicated geometrical shapes and structures to achieve desired scanning results.

Consequently, there is a strong need in the art for a non-mechanical system and/or method for bar code scanning that requires minimal components and fewer manufacturing processing steps which will ultimately provide more reliable and lower cost bar code scanners to consumers.

SUMMARY OF THE INVENTION

The present invention provides a low cost onedimensional scanning and detecting system for reading bar codes and other related symbols. The system employs an electronic scanning and detecting system which may be implemented on a small printed circuit board such as a PCMCIA card or in a hand-held scanning and detecting system. In a PCMCIA card implementation, the bar code may be analyzed and digitized locally on the PCMCIA card before being sent over a PCMCIA bus to a hand-held or standalone personal computer (PC). Alternatively, the PCMCIA card may convert the analog bar code information and send the information to the PC for appropriate computer analysis and storage. Also, since electronic scanning and receiving systems are employed, the scanning and receiving systems may be applied to small, self-contained, hand-held applications such as may be seen in a check out line for example.

More particularly, the present invention employs a piezoelectric material that is uniquely shaped to provide a non-mechanical, low cost scanning system. In particular, the present invention geometrically exploits a radially-arced piezoelectric structure that allows for a small, discrete printed circuit board implementation of a one-dimensional bar code scanning and reading system. This allows, as discussed above, for a PCMCIA card implementation which provides bar code scanning in a hand-held computer application. The present invention may be implemented with lower component and manufacturing costs than conventional systems.

According to one particular aspect of the present invention, a system is provided for scanning a target. The system includes a light source for directing a beam of light to a radially-arced piezoelectric material having a reflective surface for receiving at least a portion of the beam of light. The reflective surface directs at least a portion of the beam of light to the target, and a power source provides movement in the radially-arced piezoelectric material to scan at least a portion of the beam of light across at least a portion of the target. The at least a portion of the target is reflected onto a photosensor to provide an electrical signal representing the reflected light.

According to another aspect of the present invention, a system is provided for scanning and reading a target. The system includes: a means for directing a beam of light; a means for reflecting at least a portion of the beam of light to the target; a means for providing movement in a radially-arced piezoelectric material to change the shape of the reflecting means which effects scanning of at least a portion of the beam of light across at least a portion of the target; and a means for providing an electrical signal representing the reflected light.

According to still yet another aspect of the present invention, a method is provided for scanning and reading a target. The method includes: directing a beam of light to a radially-arced piezoelectric material having a reflective surface; receiving at the target at least a portion of the beam of light from the reflective surface; applying at least one predetermined voltage to the radially-arced piezoelectric material so as to cause the reflective surface to change shape which results in scanning of at least a portion of the beam of light along the target; and receiving at a sensor at least a portion of the beam of light from the target to provide an electrical signal representing the received light.

According to still yet another aspect of the present invention, a system is provided for scanning and reading a target. The system includes: a system for directing a beam of light; a system for providing movement in a radially-arced piezoelectric material having a reflective surface which effects scanning of at least a portion of the beam of light across at least a portion of the target; and a system for providing an electrical signal representing the reflected light.

According to still yet another aspect of the present invention, a system is provided for scanning and reading a target. The system includes: a light source for directing a beam of light; a piezoelectric material affixed to a radially-arced reflective surface for receiving at least a portion of the beam of light; wherein, the reflective surface directs at least a portion of the beam of light to the target; an AC voltage source for selectively applying predetermined voltages to the piezoelectric material so as to cause the radially-arced reflective surface to change shape which results in scanning at least a portion of the beam of light across at least a portion of the target; wherein, at least a portion of the beam of light reflected from at least a portion of the target is reflected onto a photosensor to provide an electrical signal representing the reflected light.

According to still yet another aspect of the present invention, a PCMCIA card is provided for scanning a bar code. The PCMCIA card includes: a light source for directing a beam of light; a radially-arced piezoelectric material having a reflective surface for receiving at least a portion of the beam of light; wherein, the reflective surface directs at least a portion of the beam of light to the bar code; a voltage source for selectively applying predetermined voltages to the piezoelectric material so as to cause the radially-arced reflective surface to change shape which results in scanning at least a portion of the beam of light across at least a portion of the target; wherein, the bar code reflects at least a portion of the beam of light to a photo sensor to provide an electrical signal representing the reflected light; and a conversion and interface system for transmitting a digital representation of the electrical signal across a PCMCIA bus to a scanner processing system to interpret the bar code.

To the accomplishment of the foregoing and related ends, the invention, then, comprises the features hereinafter fully described. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

The present invention will now be described with reference to the drawings, wherein like reference numerals are used to refer to like elements throughout.

The present invention provides a novel and easy to implement system for small or hand-held bar code scanning applications. Applications for scanning and receiving bar codes are virtually unlimited, and the present invention provides a straight-forward, low cost approach for processing these applications.

Figure 1:
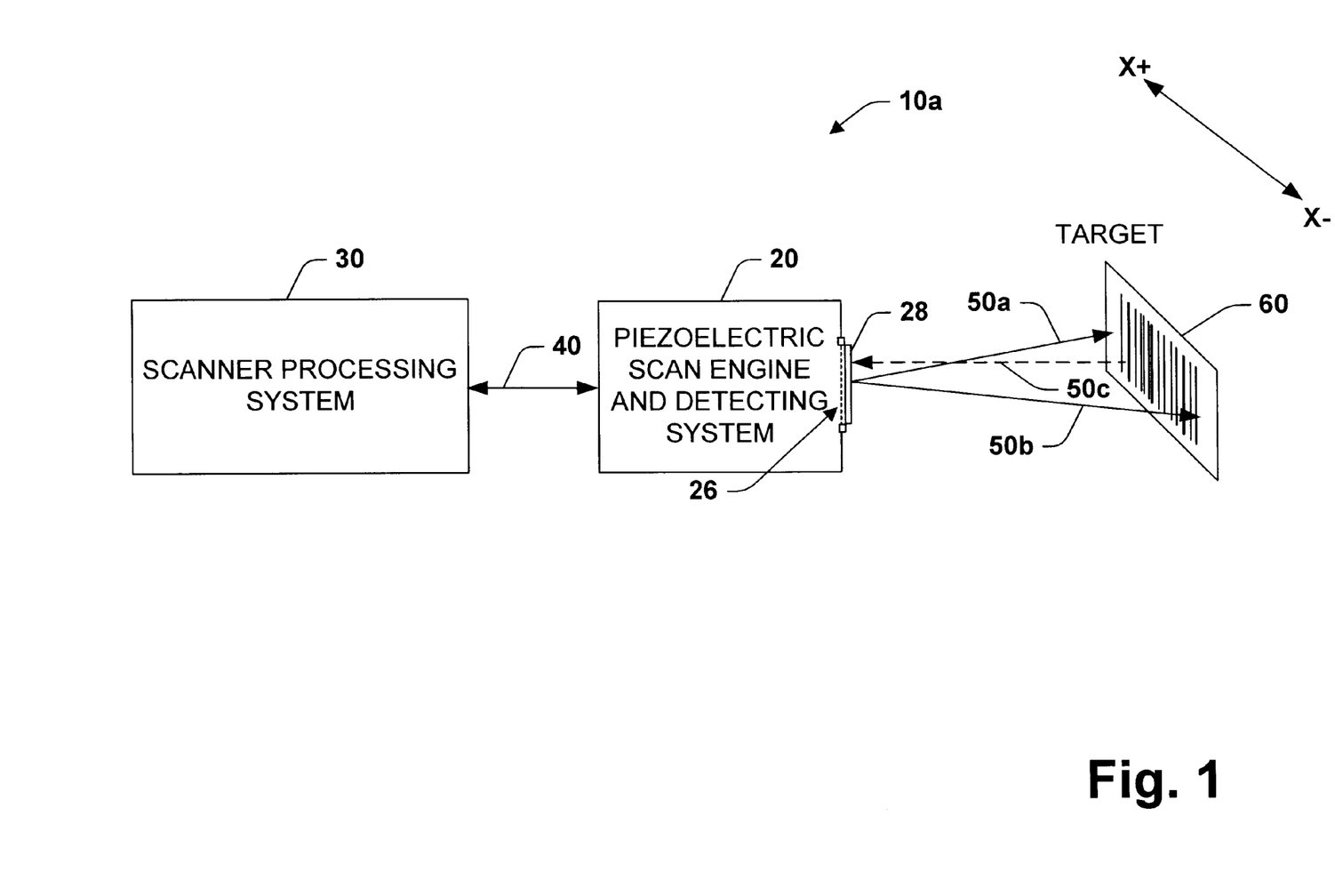
FIG. 1 is a schematic block diagram of a scanning and reading system in accordance with the present invention.

Referring initially to FIG. 1, a scanning system 10a is shown which includes a piezoelectric scan engine and detecting system (PSD) 20 operatively coupled to a scanner processing system 30 via a system bus 40. The PSD 20 projects a light ray 50a through an aperture window 26 and a focusing system 28 on to a bar code target 60. As shown, the bar code target 60 (e.g., a sequence of vertical black and white bars) is scanned from an X+ direction (depicted as light ray 50a) to an X- direction (depicted as light ray 50b). It is to be appreciated that scanning may also take place in the opposite direction. As will be described in more detail below, the PSD 20 includes a radially-arced piezoelectric material having a variable deflection angle for directing light to targets. By geometrically shaping the piezoelectric material, scanning may be achieved with minimal materials and mounting structures.

A plurality of light rays 50c (one ray is shown for simplicity) reflect from the target 60 back through the focusing system 28 on the PSD 20. The focusing system 28 may be a single optical lens system for directing and receiving light or may include a separate directing and receiving lens for sending and receiving light to and from the target 60. Focusing systems are well known in the art, therefore, further discussion related thereto is omitted for the sake of brevity.

The PSD 20, receives a light ray 50c and converts the ray to an electrical signal. The electrical signal is digitized and sent over the system bus 40 to the scanner processing system 30 for analysis and storage. It is to be appreciated that signal processing and analysis may take place at the PSD 20, or the scanner processing system 30, or shared between the two systems. The scanner processing system 30 may provide a plurality of application software systems to process the bar code information. The application software systems may include: accounting controls; inventory controls; pricing information; location information; and other information and/or functions suitably relevant to the items being scanned. In the preferred embodiment, the system bus 40 is a PCMCIA bus coupled to a hand-held personal computer. PCMCIA buses provide a high-speed standard access mechanism to share and exchange information with most personal computers and are employed by the present invention to transmit bar code information from the PSD 20 to the scanner processing system 30.

Figure 2A:
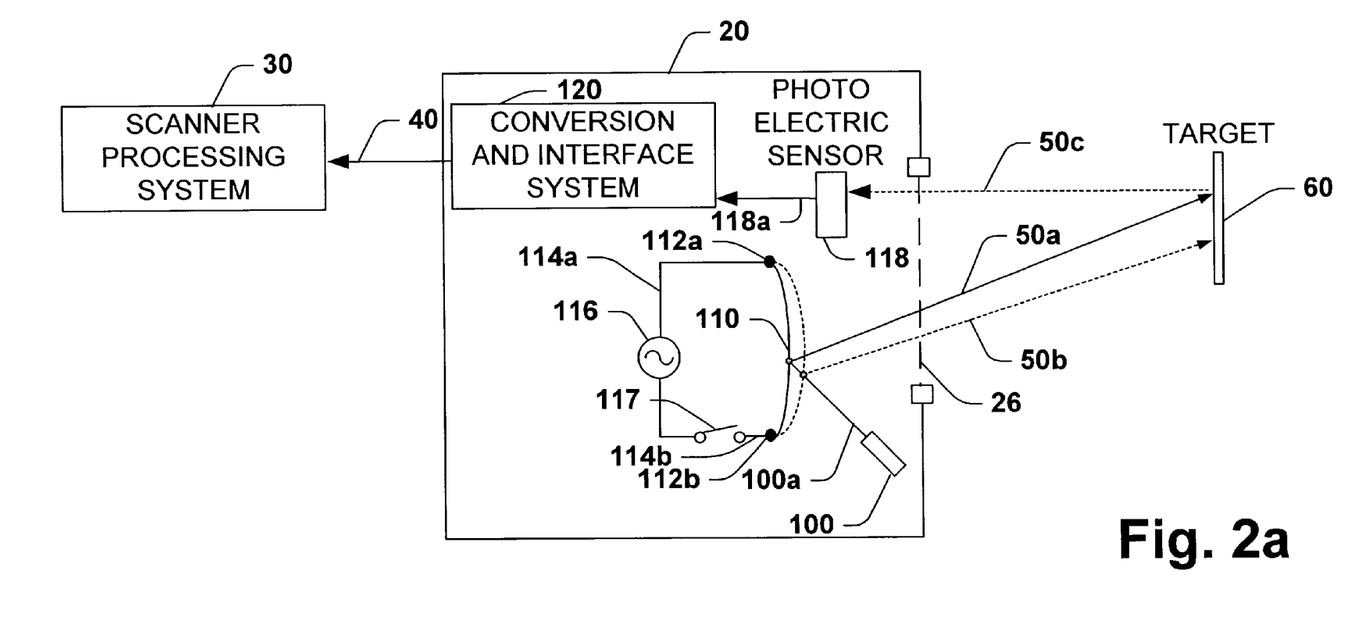
FIG. 2a is a schematic block diagram of a piezoelectric scan engine in accordance with the present invention.

FIG. 2a depicts a top view of a target 60 which is scanned by the PSD 20. A light source 100 is directed at a radially-arced surface 110a of piezoelectric material 110 which may be about two millimeters thick and approximately ten millimeters in length. The light source 100 is stationarily mounted at a fixed angle while projecting light 100a at the surface 110a. In the preferred embodiment, the light source 100 is a laser diode, although other light sources may be employed.

The piezoelectric material 110 is mounted in the form of a radially defined arc at non-movable fixed locations 112a and 112b. Affixed to the piezoelectric material 110 are electrodes 114a and 114b which are connected to an AC power source 116. When the AC power source is applied to the piezoelectric material 110, the radially defined arc of the piezoelectric material 110 is caused to expand and/or contract in a radially defined direction as depicted by the dotted line in FIG. 2a. The frequency of the AC power source 116 may be a plurality of frequencies ranging from a few Hertz to several kilohertz depending on the desired scan rate of the target 60. Sinusoidal or triangular waveforms may be employed by the AC source to provide a cyclical movement of the piezoelectric material 110. As the material 110 expands and contracts, the radially-arced surface 110a increases and decreases in a radial direction to and from the light source 100. Since the piezoelectric material 110 is geometrically formed as a radial-arc, a deflection angle is created which directs light 100a toward the target 60. As the arc expands and contracts with the applied power, the deflection angle for the approaching light 100a changes causing light rays 50a and 50b to appear at the target 60 at different points. It is to be appreciated that many different points on the target are scanned based on the variable deflection angle of the radially-arced surface 110a. Only two light rays are shown for ease of illustration. As will be described in more detail below, the radially-arced surface 110a is polished to provide a reflecting radial surface to direct the light 100a toward the target 60.

As the target 60 is scanned by the deflecting radially-arced surface 110a, light rays 50c are directed through an aperture 26 (e.g., a translucent window consisting of a plurality of colors) toward a photoelectric sensor 118. In the preferred embodiment, the sensor 118 is a photosensitive addressable array for providing pixel data in relation to the position of light received from the target 60. The photoelectric sensor 118 converts the received light rays to an electrical signal 118a which is provided to a conversion and interface system 120. As will be described in more detail below, the conversion and interface system 120 is responsible for digitizing the electric signal 118a and transferring binary information representing bar code data via system bus 40 to the scanner processing system 30. A trigger switch 117 is shown interrupting the AC source 116 to the piezoelectric material 110. The trigger switch 117 allows a user to actively scan the target 60 when the switch 117 is engaged.

Figure 2B:
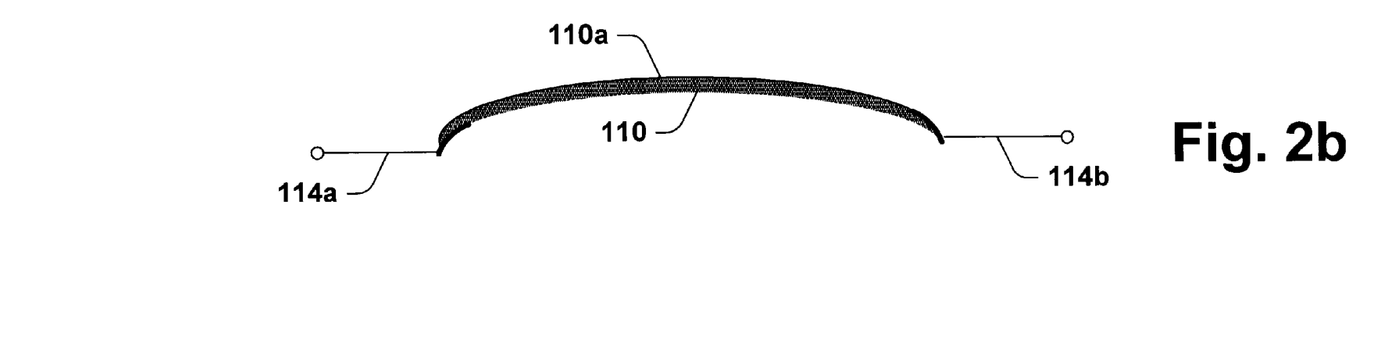
FIG. 2b is detailed drawing of a piezoelectric material in accordance with the present invention.

Now referring to FIG. 2b, a detailed drawing of the radially-arced piezoelectric material 110 is shown. The piezoelectric material 110 has a polished surface 110a for reflecting light toward the target 60. Polishing may be achieved by applying well known chemical or mechanical processes on the surface 110a. It is also to be appreciated that a metallic layer (e.g., metallic foil) could be attached to the surface of the piezoelectric material to provide a reflecting surface. As shown, electrodes 114a and 114b are attached to a first and second end of a single layer of piezoelectric material 110. When voltage is applied to the ends of the material as shown in FIG. 2a, the curvature of the formed arc changes because of an elongation in the crystalline structure of the piezoelectric material 110. A plurality of various piezoelectric materials may be employed as long as the crystalline structure of the material is conformable to an arc and is suitable for polishing. By forming an arc to provide a deflection angle, the present invention provides several advantages over conventional systems. For example, the arc provides a variable deflection angle from a single layered piezoelectric material. A small movement in the arc allows for a wide deflection pattern on the target 60. This provides a wide-angle deflection system formed from a single layer of low cost piezoelectric material. Many conventional systems, employ multiple layers of material or rely on complicated structures in order to produce the necessary deflection angles. Another advantage of the radially formed arc is that scanner manufacturing costs may be reduced since the low cost piezoelectric material is readily mounted to a printed circuit board at two fixed locations 112a and 112b.

Figure 3A:
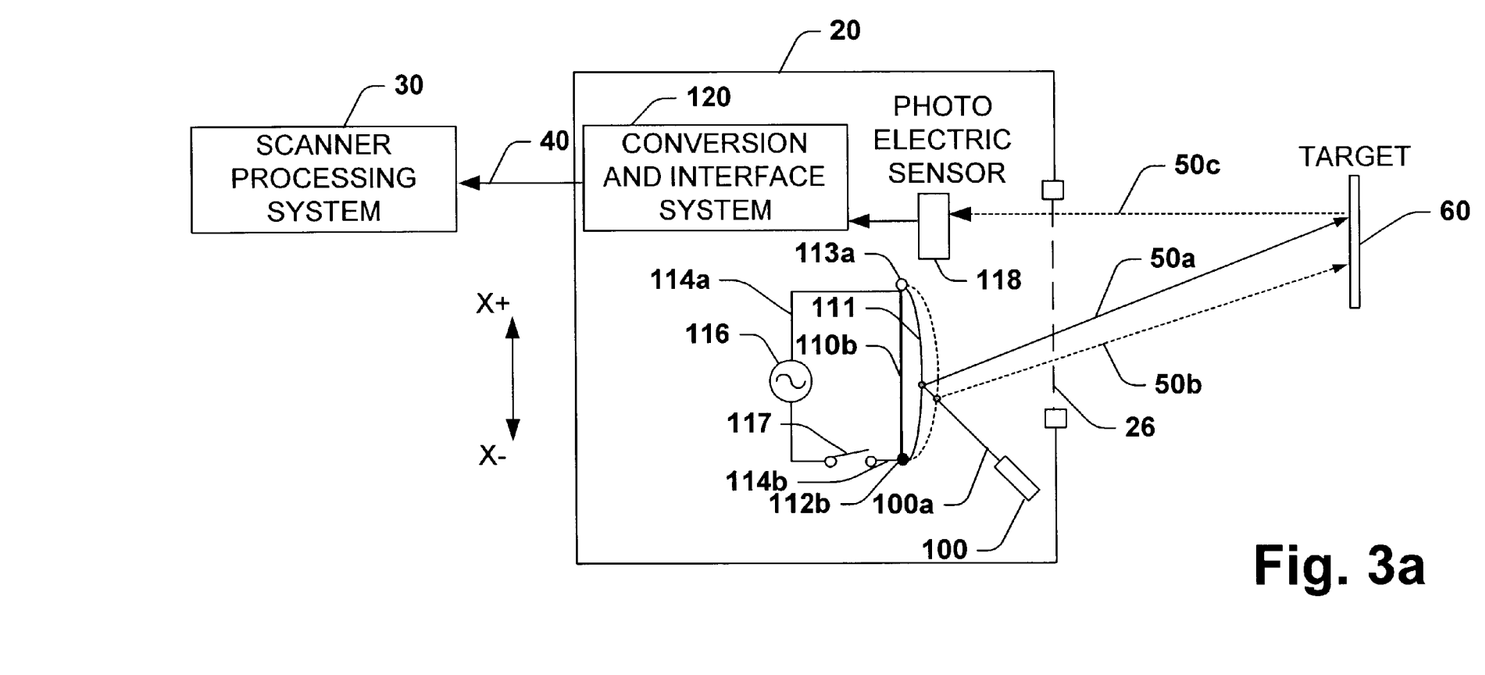
FIG. 3a is a schematic block diagram of another embodiment of a piezoelectric scan engine in accordance with the present invention.
Figure 3B:
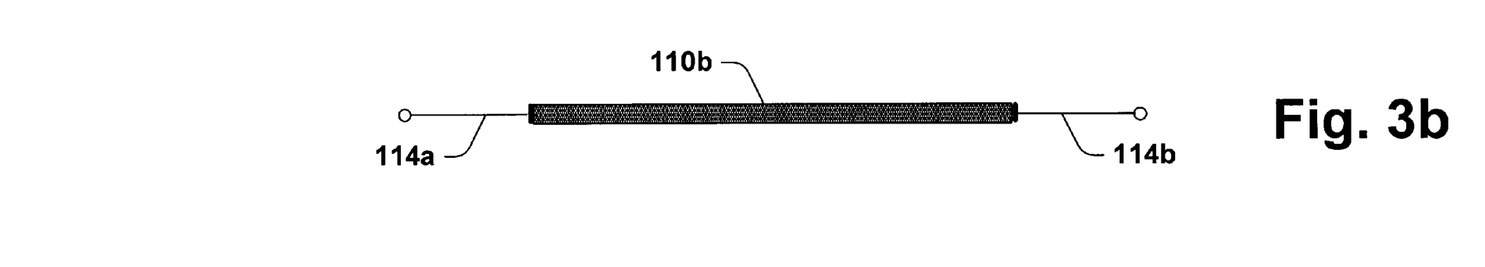
FIG. 3b is detailed drawing of another embodiment for a piezoelectric material in accordance with the present invention.
Figure 4A:
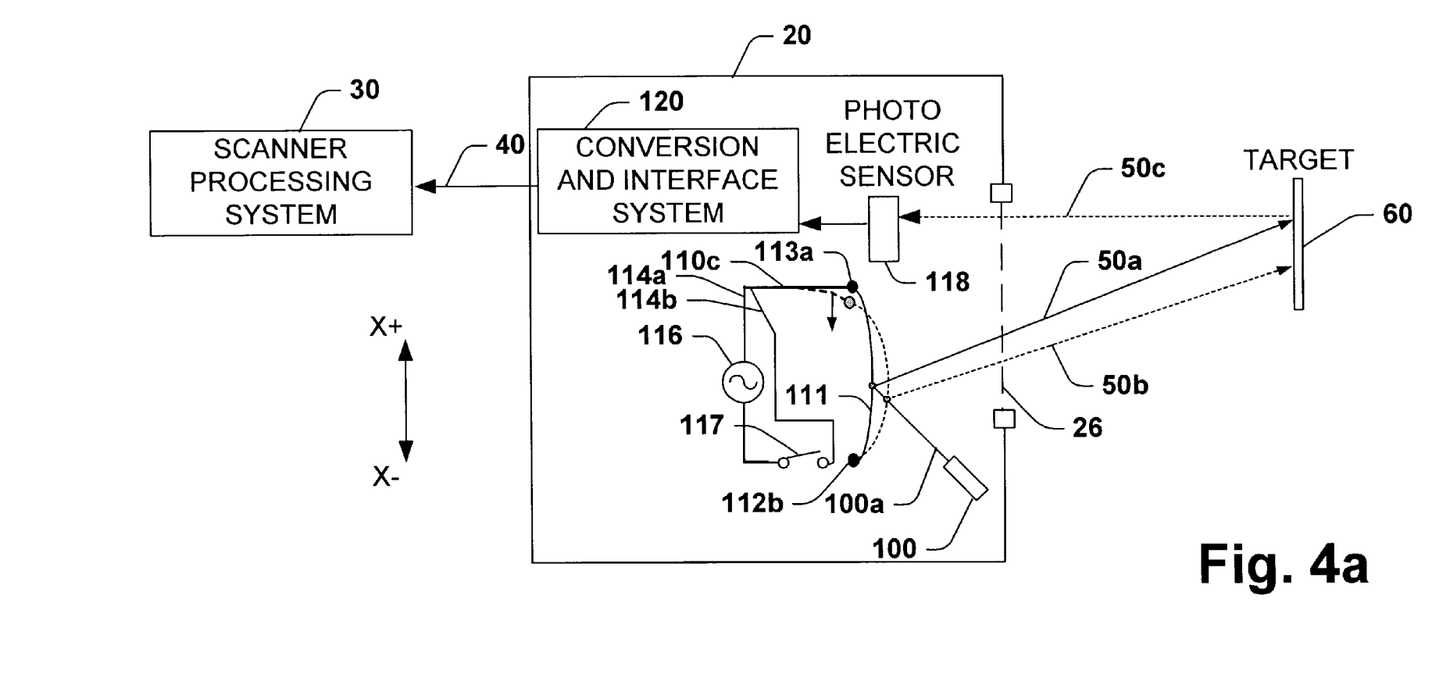
FIG. 4a is a schematic block diagram of another embodiment of a piezoelectric scan engine in accordance with the present invention.
Figure 4B:
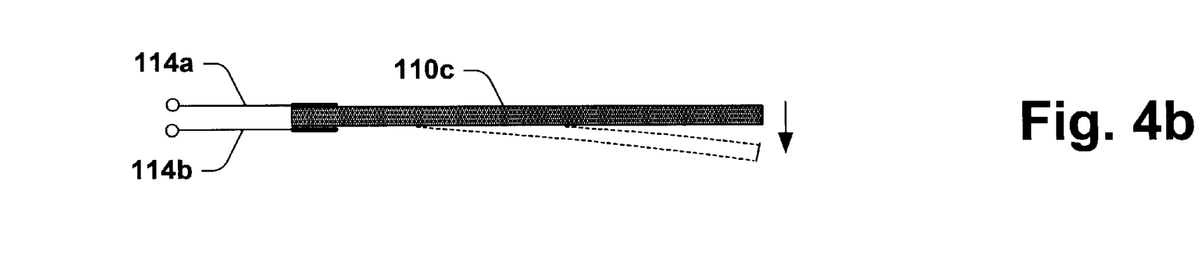
FIG. 4b is detailed drawing of another embodiment for a piezoelectric material in accordance with the present invention.

Turning now to FIG. 3a, another embodiment of the present invention is illustrated. In this embodiment, the piezoelectric material 110b is formed as a straitened single layer with electrodes 114a and 114b attached at opposing ends as shown in FIG. 3b. A metallic reflective foil 111 is radially formed and attached to both ends of the piezoelectric material 110b. As shown in FIG. 3a, one end of the piezoelectric material 110b is stationarily fixed at point 112b. The other end of the piezoelectric material is free to move at point 113a in the +X or −X direction. As an AC voltage 116 is applied, the piezoelectric material lengthens and contracts in a straight line causing the radially formed arc in the metallic foil to radially deflect inward or outward. As described above, when the radially formed metallic arc moves, a variable deflection angle is provided to direct the light 100a to the target 60. It is to be appreciated that many embodiments for deploying a radially-arced deflection system are possible. For example, referring to FIG. 4a and FIG. 4b, another embodiment of the present invention is illustrated. A piezoelectric material 110c is shown in FIG. 4b, with electrodes 114a and 114b at the same end of the material. When a voltage is applied to the piezoelectric material 110c, a bend may occur in the direction of the arrow toward the dotted line as shown, for example. Bends may occur in the opposite direction if an opposite polarity voltage is applied. As shown in FIG. 4a, a metallic foil is attached to a fixed point 112b and to one end of the piezoelectric material 110c. When the AC voltage source 116 is applied to the piezoelectric material 110c, a bend occurs in the +X or −X direction causing the metallic foil 111 radius to increase or decrease. As described above, when the radially formed arc 111 changes due to the applied voltage, a variable deflection angle surface is formed which directs light 100a to the target 60.

Figure 5:
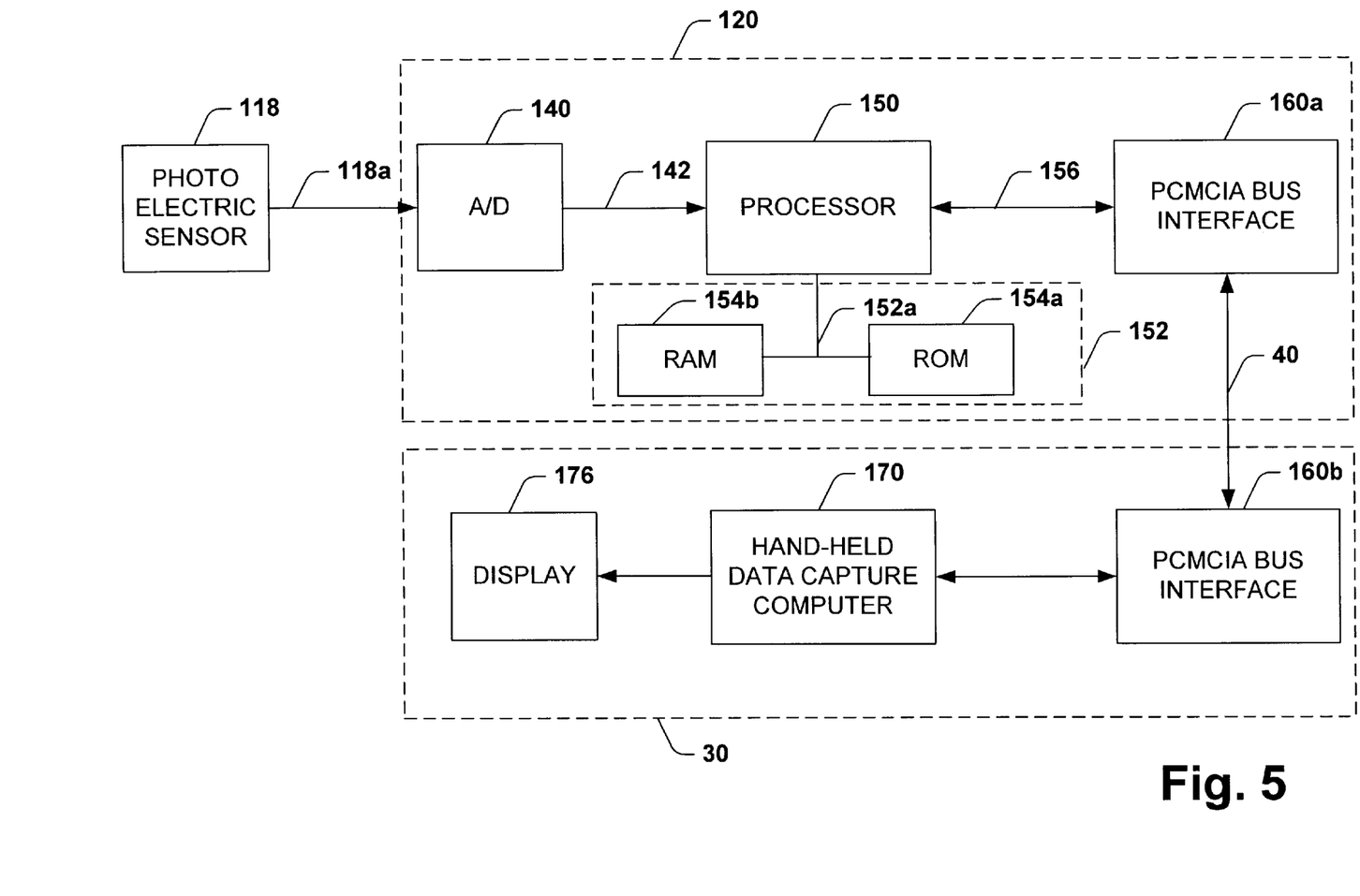
FIG. 5 is a schematic block diagram of a conversion and interface system coupled to a scanner processing system in accordance with the present invention.

Referring now to FIG. 5, a conversion and interface system 120 is shown operatively coupled to the scanner processing system 30 via the PCMCIA system bus 40. As shown, an electrical output signal 118a from the photoelectric sensor 118 is coupled to the input of an analog to digital (A/D) converter 140, which converts the analog signals provided by the photoelectric sensor 118 to digital form. As described above, the photoelectric sensor 118 is an addressable array. Address lines (not shown) from the conversion and interface system 120, direct target image pixel data from the photoelectric sensor 118 to the A/D converter 140. The A/D 140 provides binary codes to a processor 150 which controls the general operation of the interface system 120 and provides addressing for the photoelectric sensor 118. The binary codes represent the scanned black and white bars from the target and generally represent pixel intensity from the photoelectric sensor 118.

The processor 150 is programmed to control and operate various components within the conversion and interface system 120 in order to carry out the various functions described herein. The processor or CPU 150 can be any of a plurality of processors, such as the p24T, Pentium 50/75, Pentium 60/90, and Pentium 66/100, Pentium PRO, and Pentium 2, and substantially any other similar or compatible processors. The manner in which the processor 150 can be programmed to carry out functions relating to the present invention will be readily apparent to those having ordinary skill in the art based on the description provided herein.

A memory 152 tied to the processor 150 via bus 152a is also included in the conversion and interface system 120 and serves to store program code executed by the processor 150 for carrying out operating functions of the system 120 as described herein. The memory 152 also serves as a storage medium for temporarily storing information such as historical inventory bar code data and the like. The memory 152 is adapted to store a complete set of information to be transmitted to the scanner processing system 30. According to a preferred embodiment, the memory 152 has sufficient capacity to store multiple sets of bar codes and other information, and the processor 150 could include a program for alternating or cycling between various sets of previously stored bar code information. In this way, pricing and inventory analysis, for example, may occur as the bar code is scanned in. It is to be appreciated, however, that bar code information may be passed to the scanner processing system 30 where equivalent or additional processing may occur.

The memory 152 includes read only memory (ROM) 154a and random access memory (RAM) 154b. The ROM 154a contains among other code the Basic Input-Output System (BIOS) which controls basic hardware operations of the conversion and interface system 120. The RAM 154b is the main memory into which the operating system and application programs are loaded and where scratch pad operations are performed to process the raw bar code information.

The processor 150 is coupled to a PCMCIA bus interface system 160a via internal bus 156. The PCMCIA bus interface system 160a provides the interface to the PCMCIA bus 40 and ultimately allows the conversion and interface system to communicate with the scanner processing system 30. PCMCIA bus interface systems 160a may include Application Specific Integrated Circuits (ASIC) or may employ off the shelf components which are commercially available from several suppliers. In general, PCMCIA bus interface systems are well known in the art and may be readily implemented by one of ordinary skill in the art.

As shown in FIG. 5, the scanner processing system 30 communicates with the conversion and interface system 120 over the PCMCIA bus 40. The scanner processing system 30, in the preferred embodiment, is a hand-held data capture computer 170 having a PCMCIA bus interface system 160b. The hand-held computer 170 may be any suitable commercially available personal computer having a PCMCIA bus interface and may include a display 176 for viewing bar codes and other related information. A hand-held computer is preferably employed so that a user may perform hand-held bar code scanning by inserting a PCMCIA card scan engine as shown in FIG. 1 into a PCMCIA slot of the hand-held computer. It is to be appreciated however, that the present invention is not limited to the embodiment disclosed herein. The scanner, conversion, and hand-held systems may be combined, for example, to form an integrally contained monolithic system. A significant advantage of the present invention is that the scan engine may be implemented with small, non-moving components. Thus, virtually any suitable computing or processing system and/or environment may be employed to carry out the present invention.

Figure 6:
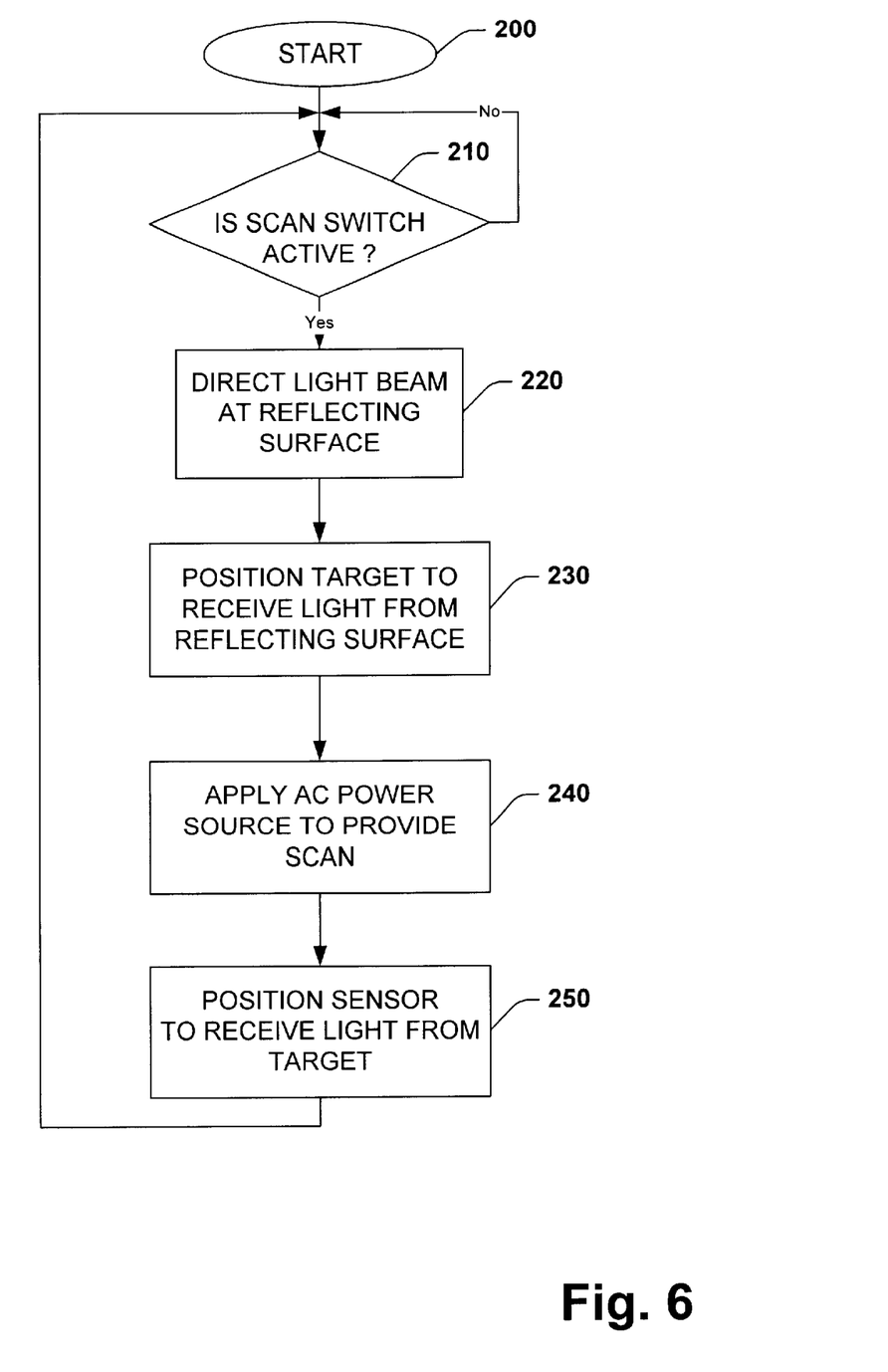
FIG. 6 is a block diagram methodology in accordance with the present invention.

Now referring to FIG. 6, a block diagram methodology is provided for carrying out the present invention. Beginning at step 200, various processor initialization tasks and background activities are performed as power is applied to the scanner processing system and the conversion and interface system. After these tasks are performed the method proceeds to step 210. At step 210, the method determines if a user has activated a scan switch. If not, the method remains in a loop at step 210 and all power is withheld from the scan engine. If a user has activated the scan switch, the method proceeds to step 220.

At step 220, a light beam is energized and directed at a reflecting surface of a radially-arced piezoelectric material. After directing the light beam, the method proceeds to step 230. At step 230, a target (e.g., bar code) is generally positioned to receive at least a portion of the beam of light from the reflecting surface of the piezoelectric material. After positioning the target, the method proceeds to step 240. At step 240, AC power is applied to the radially-arced piezoelectric material. As described above, the AC power source causes the radial surface of the piezoelectric material to produce a variable deflection angle for the light beam. As the deflection angle is varied, the light beam is scanned across the target and the method proceeds to step 250. At step 250, a photo sensor is generally positioned to receive light from the target. The photosensor converts the received light to an electrical signal representing the received light. After the target is completely scanned, the method proceeds back to step 210 to determine if another scan sequence should occur by monitoring the user scan switch.

Those skilled in the art will recognize that the embodiment(s) described above and illustrated in the attached drawings are intended for purposes of illustration only and that the subject invention may be implemented in various ways. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system for scanning a target, comprising:
   a light source for directing a beam of light;
   a radially-arced piezoelectric material having a reflective surface for receiving at least a portion of the beam of light;
   wherein the reflective surface directs the at least a portion of the beam of light to the target;
   a power source for providing movement in the radially-arced piezoelectric material to scan the at least a portion of the beam of light across at least a portion of the target; and
   wherein the at least a portion of the beam of light reflected from the at least a portion of the target is reflected onto a photosensor to provide an electrical signal representing the reflected light.

2. The system of claim 1 wherein the light source is a laser diode.

3. The system of claim 1 wherein the radially-arced piezoelectric material is at least one layer.

4. The system of claim 1 wherein the reflective surface is polished.

5. The system of claim 1 wherein the reflective surface is metallic.

6. The system of claim 1 wherein the photosensor is an addressable array.

7. The system of claim 1 further including a conversion and interface system for converting the electrical signal to a digital code.

8. The system of claim 7 further including a scanner processing system for interpreting the digital code.

9. The system of claim 1 wherein the AC power source may vary the scan frequency.

10. A system for scanning and reading a target, comprising:
   means for directing a beam of light;
   means for reflecting at least a portion of the beam of light to the target;
   means for providing movement in a radially-arced piezoelectric material to change the shape of the reflecting means which effects scanning of the at least a portion of the beam of light across at least a portion of the target; and
   means for providing an electrical signal representing the reflected light.

11. A method for scanning and reading a target, comprising the steps of:
   directing a beam of light to a radially-arced piezoelectric material having a reflective surface;
   receiving at the target at least a portion of the beam of light from the reflective surface;
   applying at least one predetermined voltage to the radially-arced piezoelectric material so as to cause the reflective surface to change shape which results in scanning of the at least a portion of the beam of light along at least a portion of the target; and
   receiving at a sensor at least a portion of the beam of light from the at least a portion of the target to provide an electrical signal representing the received light.

12. A system for scanning and reading a target, comprising:
   a system for directing a beam of light;
   a system for providing movement in a radially-arced piezoelectric material having a reflective surface which effects scanning of the at least a portion of the beam of light across at least a portion of the target; and
   a system for providing an electrical signal representing the reflected light.

13. The system of claim 12 further including a conversion and interface system for converting the electrical signal to a digital code.

14. The system of claim 13 further including a scanner processing system for interpreting the digital code.

15. The system of claim 14 further including a PCMCIA interface system to allow the scanner processing system to communicate with the conversion and interface system.

16. The system of claim 14 wherein the scanner processing system is a hand-held computer.

17. A system for scanning and reading a target, comprising:
   a light source for directing a beam of light;
   a piezoelectric material affixed to a radially-arced reflective surface for receiving at least a portion of the beam of light;
   wherein the reflective surface directs the at least a portion of the beam of light to the target;
   a voltage source for selectively applying predetermined voltages to the piezoelectric material so as to cause the radially-arced reflective surface to change shape which results in scanning the at least a portion of the beam of light across at least a portion of the target; and
   wherein the at least a portion of the beam of light reflected from the at least a portion of the target is reflected onto a photosensor to provide an electrical signal representing the reflected light.

18. The system of claim 17 wherein the radially-arced surface is affixed to the piezoelectric material at least at one point.

19. The system of claim 17 wherein the radially-arced surface is affixed to the piezoelectric material at a plurality of points.

20. A PCMCIA card for scanning a bar code, comprising:
   a light source for directing a beam of light;
   a radially-arced piezoelectric material having a reflective surface for receiving at least a portion of the beam of light;
   wherein the reflective surface directs the at least a portion of the beam of light to the bar code;
   a voltage source for selectively applying predetermined voltages to the piezoelectric material so as to cause the radially-arced reflective surface to change shape which results in scanning the at least a portion of the beam of light across at least a portion of the target;
   wherein the bar code reflects the at least a portion of the beam of light to a photo sensor to provide an electrical signal representing the reflected light; and
   a conversion and interface system for transmitting a digital representation of the electrical signal across a PCMCIA bus to a scanner processing system to interpret the bar code.

21. The PCMCIA card of claim 20 wherein the light source is a laser diode.

22. The PCMCIA card of claim 20 wherein the radially-arced piezoelectric material is at least one layer.

23. The PCMCIA card of claim 20 wherein the reflective surface is polished.

24. The PCMCIA card of claim 20 wherein the reflective surface is metallic.

25. The PCMCIA card of claim 20 wherein the photosensor is an addressable array.

26. The PCMCIA card of claim 20 further including a conversion and interface system for converting the electrical signal to a digital code.

27. The PCMCIA card of claim 26 further including a scanner processing system for interpreting the digital code.

28. The PCMCIA card of claim 20 wherein the AC voltage source may vary the scan frequency.

* * * * *